Sept. 18, 1934.  A. C. FLETCHER  1,973,977
GAS AND AIR MIXING VALVE
Filed July 28, 1932
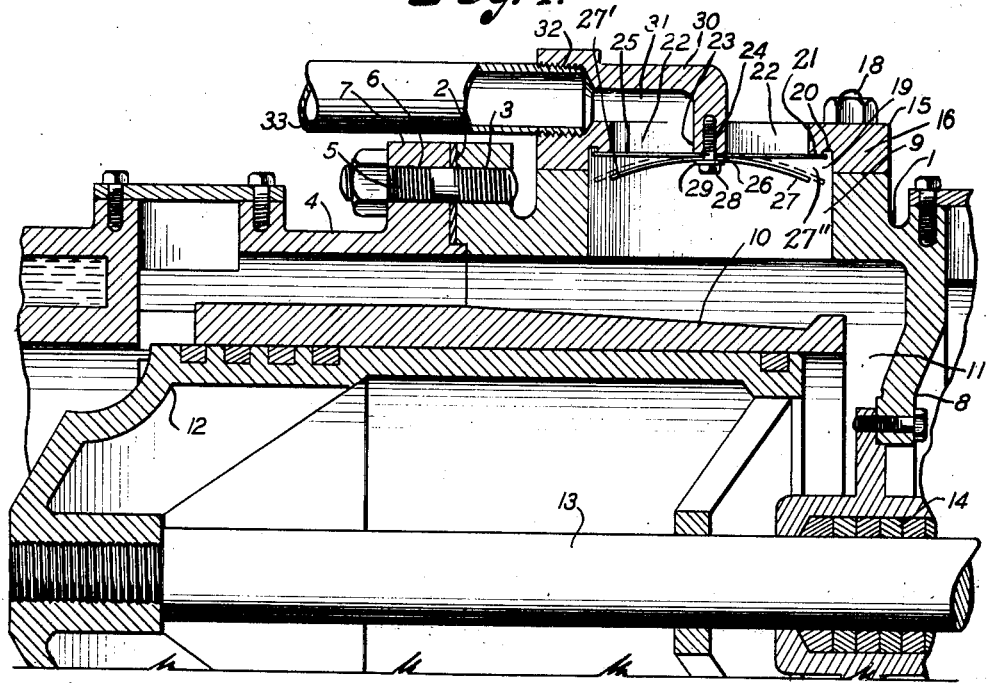
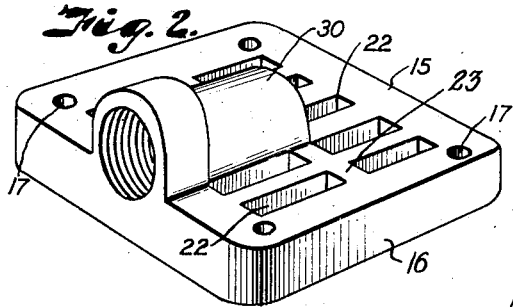
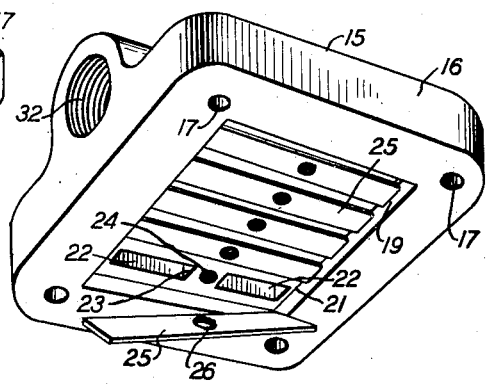
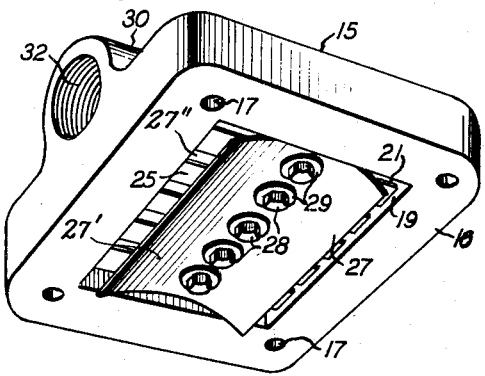
INVENTOR.
Albert C. Fletcher
BY
ATTORNEY.

Patented Sept. 18, 1934

1,973,977

UNITED STATES PATENT OFFICE 1,973,977

GAS AND AIR MIXING VALVE

Albert C. Fletcher, Deer Creek, Okla., assignor to Acme Foundry and Machine Company, Blackwell, Okla., a corporation of Oklahoma Application July 28, 1932, Serial No. 625,509

2 Claims. (Cl. 48—180)

My invention relates to valves and more particularly to mixing valves for use on internal combustion engines, the principal object of my invention being to provide a unitary valve for controlling the supply and proportions of gas and air to the combustion chamber of an engine, thereby effecting a more complete mixture of the fuel charge and consequent higher degree of efficiency than can be obtained by separate introduction of the fuel ingredients into an engine.

It is a further object of the invention to provide a valve of simple construction having a minimum number of parts to facilitate assembling of the valve members and to reduce the cost to manufacture.

In accomplishing these and other objects of my invention, I have provided improved details of structure, the preferred form of which is illustrated in the accompanying drawing, wherein:

Fig. 1 is a longitudinal section of a portion of an engine and of a valve embodying my invention mounted thereon.

Fig. 2 is a perspective view particularly showing the upper face of the valve body.

Fig. 3 is a perspective view of the valve as viewed from beneath showing the valve members in assembled condition.

Fig. 4 is a similar view showing the lower recessed face of the valve body with valve springs seated therein, one of the springs and a keeper plate being shown in disassembled relation with the body.

Referring more in detail to the drawing:

1 designates a portion of an engine base having an end face 2 provided with threaded openings 3 for mounting a cylinder jacket 4 secured to the base by bolts 5 which are extended through openings 6 in end flanges 7 of the jacket and threaded into the openings 3.

In the present disclosure illustrating the application of my invention, the engine is of the two cycle internal combustion type and the base portion is provided with a dividing wall 8 and with a lateral inlet opening 9 to the rear of the wall. A cylinder 10, cast integrally with the cylinder jacket and projecting into the base portion into proximity with the wall 8 forms an intake and mixing chamber 11 between the walls of the cylinder and jacket.

As in usual practice, a piston 12 is slidably mounted in the cylinder and a rod 13 is secured thereto and extended through packing means 14 provided for sealing travel of the rod through the wall 8.

All of the foregoing structure is conventional and does not form a part of the present invention, but has been described to more clearly illustrate one form of application of a valve 15 embodying my invention.

The valve includes a body 16 preferably rectangular in shape and provided with openings 17 for receiving bolts 18 secured in the base member 1 for firmly attaching the valve to the engine. The valve body is formed with a recess 19 in its lower face and as is particularly shown at 20, (Fig. 1), the margin of the recess is of increased depth to form a raised shoulder or valve seat 21.

Provided in the valve body and opening through the recesses are a plurality of ports 22 preferably arranged in a pair of parallel rows of transversely aligned openings, spaced by a central rib 23 having a threaded socket 24 for each of the pair of openings. A plurality of rectangular spring blades 25 comparing in number to the pairs of openings and having central apertures 26, are adapted to overlie the series of paired ports so that a single blade will simultaneously engage a pair of seats 21 to cover a pair of the ports 22. The blades are held firmly in the base of the recess by a keeper plate 27 secured to the body by bolts 28 or the like, extended through the plate and apertures 26 of the spring blades and threaded into the sockets 24, washers 29 being preferably mounted on the bolts adjacent their heads to securely anchor the keeper plate to the valve body.

The keeper plate is of arcuate or concave form providing wing portions 27' curving from the body member to permit flexing of the spring blades for opening the ports and is further shaped arcuately to prevent abrupt bending and breaking of the blades. The wing portions 27' further provide elongated outlet ports 27'' through which the gas and air flow into the mixing chamber in such a manner as to create turbulence and mixture of the gas and air.

In order to admit gas and air simultaneously through the valve body, a boss 30 is provided on the upper surface of the body and includes a channel 31 communicating with one of the ports 22 and opening at its opposite end in an enlarged internally threaded recess 32 for receiving a fuel supply pipe 33 threaded into the recess.

Assuming a valve to be constructed as described and to be mounted on an engine in communication with the inlet opening thereof, its operation is as follows:

As the piston moves inwardly on its power stroke, a vacuum is formed in the inlet chamber, thereby drawing a charge of gas and air, against the spring tension of the blades, in mixed condition into the inlet chamber.

Upon reverse movement of the piston, the charge in the mixing chamber 11 is compressed to a pressure greater than atmospheric so that the spring blades are retained against their seats, the inherent resiliency of the blades further tending to maintain the ports in closed condition.

It will be noted that the proportion of air and gas is definitely controlled by the combined area of the air inlet openings 22 in relation to the area of the gas inlet opening.

As a result of employing both ends of a spring blade for controlling separate openings, the number of valve parts is reduced and the procedure of assembling the blades in the valve body recess or of replacing a broken blade is simplified by the provision of a single keeper plate for the plurality of blades, it being only necessary when replacing a blade to loosen all of the bolts 28 and to remove the bolt extended through the plate to be replaced. A new spring can then be substituted for the weak or broken blade, whereupon the bolt is replaced and tightened together with the remaining bolts.

If it is desired to increase or decrease the amount of fuel admitted to the engine, the keeper plate may be substituted by one having more or less curvature, thereby allowing the spring blades to flex accordingly.

From the foregoing, it will be apparent that I have provided a valve of simple construction, serving to effect a thorough mixture of the fuel ingredients in their passage into the inlet chamber of an engine.

What I claim and desire to secure by Letters Patent is:

1. A gas and air mixing valve including a body member having parallel rows of aligned ports separated by a central rib, a gas inlet member covering one of said ports on one side of the body member, resilient blades having ends yieldingly covering the aligned ports at opposite sides of the central rib, a curved plate member having a central portion engaging the blades over said rib and having wing portions curving from the body member whereby the ends of the blades are free to move from covering relation with said ports independently of each other, and means extending through the central portion of said curved plate to clamp the central portions of the blades tightly against said rib to effect said independent movement of the ends of the blades.

2. In combination with a gas and air mixing chamber, a gas and air mixing valve for the mixing chamber, including a body member having a rectangular recess and provided with parallel rows of aligned ports opening to said recess, a gas inlet member covering one of said ports, resilient blades covering said ports, a curved plate member having a central portion engaging said blades between the parallel rows of ports and having wings curving away from the ends of said blades and cooperating with the side walls of the recess to form elongated outlets into said mixing chamber at opposite sides of the body member for creating turbulence and mixture of gases passing through said ports into said mixing chamber, and means for securing said plate member to the body member.

ALBERT C. FLETCHER.